J. A. BOWDEN.
DUST CAP AND ATTACHING MEANS THEREFOR.
APPLICATION FILED MAR. 22, 1919.
1,328,488.  Patented Jan. 20, 1920.
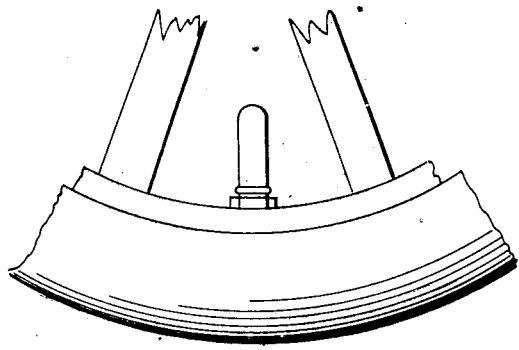
FIG. 1
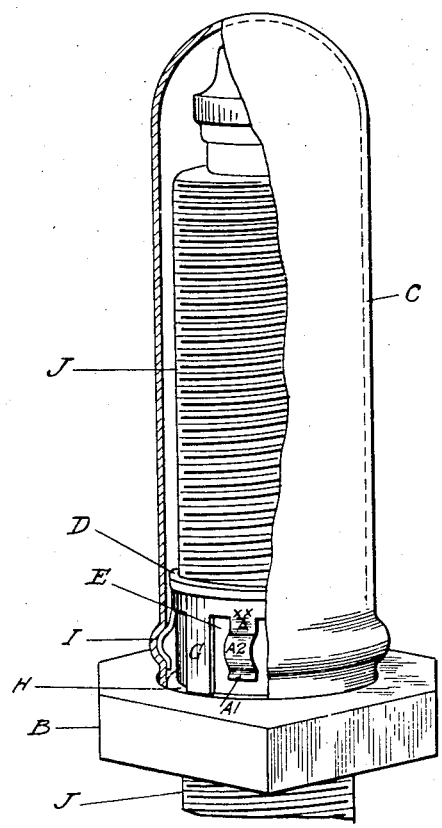
FIG. 2
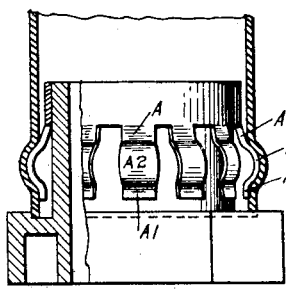
FIG. 7
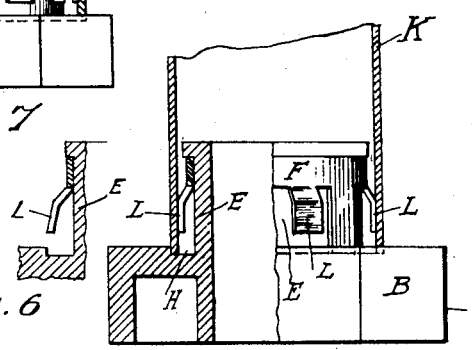
FIG. 6
FIG. 5
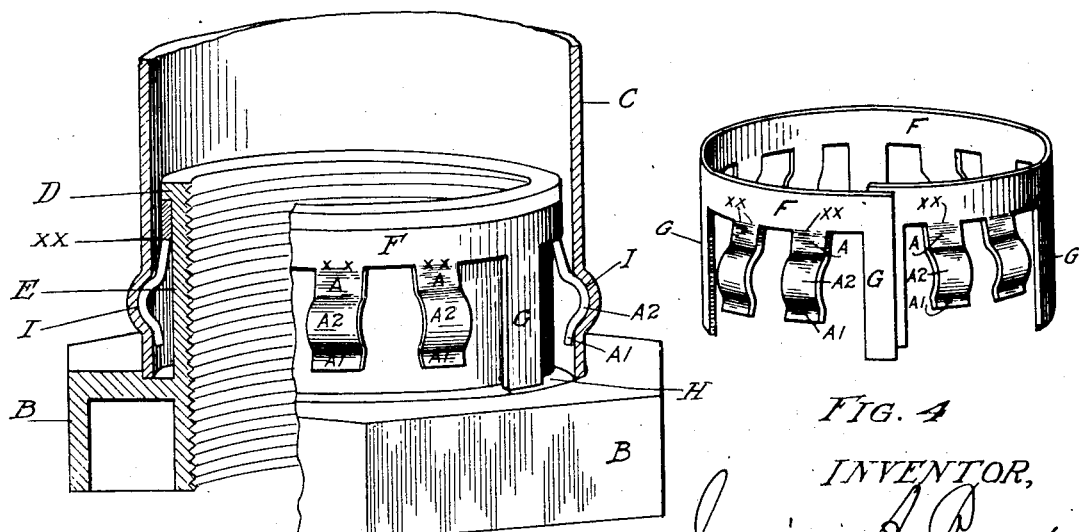
FIG. 3
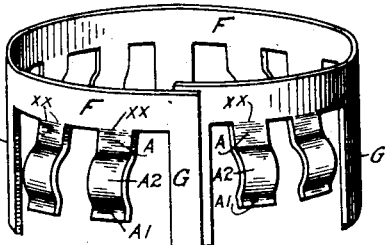
FIG. 4
INVENTOR,
Junius A. Bowden

UNITED STATES PATENT OFFICE.

JUNIUS A. BOWDEN, OF LOS ANGELES, CALIFORNIA.

DUST-CAP AND ATTACHING MEANS THEREFOR.

1,328,488.  Specification of Letters Patent.  Patented Jan. 20, 1920.

Application filed March 22, 1919. Serial No. 284,415.

*To all whom it may concern:*

Be it known that I, JUNIUS A. BOWDEN, a citizen of the United States, residing at Los Angeles, in the county of Los Angeles, State of California, have invented new and useful Improvements in Dust-Caps and Attaching Means Therefor, of which the following is a specification.

This invention relates to a quick detachable dust cap for an air inlet stem of a tire.

The main object of my invention is to provide a specially constructed spring and of such form that will fit into a very narrow and limited space and so constructed that it will hold into place and remain in its position with the least liability of displacement or shifting and yet perform all the functions of a spring that is not limited or hampered by small quarters. The object being to provide means adapted for holding a quick detachable dust cap upon the air inlet stem of a tire, without rotation or movement of the cap other than pressing it directly on and simply pulling it directly off, as effected in glove fastenings.

With these and other objects in view, the advantages of my improvement will be brought out fully and clearly in the following specification and accompanying drawings.

Figure 1 shows the dust cap mounted upon an air inlet stem of a tire. Fig. 2 shows the dust cap partially cut away, exposing the inlet stem and my improved spring mounted on a nut. Fig. 3 shows an enlarged view of the spring partially in section, the spring being mounted on a nut and a section of a dust cap mounted on the spring. Fig. 4 shows the spring alone. Fig. 5 shows a modified form of spring and cap, partially in section, the cap being mounted on the spring and the spring contracted. Fig. 6 shows a section of the modified form of spring before its contraction. Fig. 7 shows a modified form of spring, mounted on a nut, and the nut without a shoulder.

Referring to the details of the different drawings, Figs. 1, 2, 3 and 4 show my preferred form, although the modified forms come within the scope of my invention.

In Fig. 3, I show the spring A, mounted on a nut B, and a dust cap C, mounted on the spring. The spring is split as shown in Fig. 4 and snaps into place beneath the shoulder D, of the nut B and the band F, of the spring, and clings firmly to the neck E of the nut. Integral with the band F, are spring tongues $A^1$ also legs G. When the spring is mounted upon the neck of the nut, the legs G extend to the bottom of the recess H, of the nut, and rest against the bottom of the recess. The band F, of the spring, fits snugly beneath the shoulder D and against the neck of the nut. These legs fit closely against the neck of the nut, caused by the tension in the spring of the band, which is made partly closed, as shown in Fig. 4. When the band is mounted on the nut, it is expanded and again closes firmly against the neck of the nut. The legs act to support the band F, of the spring and hold the band which carries the tongues from dropping down and thus allow free action of the tongues at their lower end, to move toward and away from the neck of the nut without striking, the tongues being made shorter than the legs. Without the legs supporting the tongues above the recess H, in the base of the nut or some other means of support at the top of neck of the nut, they would slide down when the cap was pressed down against the raised portion $A^2$ of the tongue and prevent spring action also prevent registering the groove I, of the cap, with the raised portion, consequently fail to lock the cap to the spring which is the means of holding the cap detachably connected to the spring, for the purpose of shielding the air inlet stem J. The spring is flattened across its face at $x$ $x$ so as to give it full benefit of spring action and avoid buckling as would otherwise occur at the base of the band, which of course is circular in form. This spring is made from very thin sheet metal. The space it occupies is necessarily very shallow being only $\frac{1}{64}$ inch deep. Fig. 4 shows the spring before it is mounted. I do not limit myself to employing the leg supports G. The principal object is to provide a spring suitable to do the work in the small space it has to occupy. My improved spring as shown in the drawings having tongues formed with the raised portion $A^2$ and the tongues flanged outwardly at their lower end, gives a highly efficient result. The legs make a convenient and inexpensive way to support the band and tongues, but any means for securing the band that will allow free action of the tongues, as shown in the modified form, as of Fig. 7 comes within the spirit of my invention. This band without the legs, may be soldered or fastened in any manner to the upper end of the neck of the nut, and give free action to the end of the tongues.

In Fig. 5 of the modified form, the cap K, is formed with straight sides and the tongues L are formed slightly different than the tongues A¹, of my preferred form, these tongues hold the cap K, by frictional contact. Fig. 6 shows the tongue of Fig. 5 in its normal position before contraction. These modified forms come within the scope of my invention, the main object being to form a band combining flaring spring tongues integral with each other and means whereby the outer ends of the tongues will have free action to expand and contract when mounted on a nut such as shown, and adapted for pressing a dust cap downward against the tension of the tongues for the purpose of holding a dust cap detachably connected to the nut.

What I claim is:

1. As means of holding a dust cap detachably connected to a nut, a metal band formed with a series of spring tongues integral therewith, said band adapted to be secured to said nut, said tongues formed to flare outwardly of said band and flattened at the juncture of the tongues where the tongues join the band, said cap adapted to detachably coengage said band.

2. As means of holding a dust cap detachably connected to a nut, a metal band formed with a series of spring tongues integral therewith, said band adapted to be secured to said nut, said tongues formed to flare outwardly of said band and flattened at the juncture of the tongues where the tongues join the band, said tongues having an external raised portion, said cap adapted to detachably coengage said band.

3. As means for holding a dust cap detachably connected to a nut, a band having a series of spring tongues formed integral with said band, said tongues formed to flare outwardly of the band, said nut having an outwardly extended neck, means of securing said band to the upper end of said neck adapted to hold said tongues suspended above the base of said neck for the purpose described.

4. As means for holding a dust cap detachably connected to a nut, a band having a series of spring tongues formed integral with said band, said tongues formed with an external raised portion and formed to flare outwardly of the band, said nut having an outwardly extended neck, means of securing said band to the upper end of said neck adapted to hold said tongues suspended above the base of said neck for the purpose described.

5. As means of holding a dust cap detachably connected to a nut, a band of sheet metal formed with a series of spring tongues and numerous legs, said tongues and legs being formed integral with said band, said legs made to extend beyond the tongues, said tongues formed to flare outwardly of said band.

6. As means of holding a dust cap detachably connected to a nut, a band of sheet metal formed with a series of spring tongues and numerous legs, said tongues and legs being formed integral with said band, said legs made to extend beyond the tongues, said tongues having an external raised portion and formed to flare outwardly of said band.

7. As means of holding a dust cap detachably connected to a nut, a band having a series of spring tongues and legs formed integral therewith, said tongues formed to flare outwardly of the band and said legs, said nut having an outwardly extended neck and an external shoulder at the outer end thereof, said legs formed to extend below the bottom of said tongues, said band adapted to be mounted on said neck whereby the legs join against the nut at base of the neck, adapted to hold the band from displacement and hold the tongues suspended above the base of the neck, for the purpose described.

8. As means of holding a dust cap detachably connected to a nut, a band having a series of spring tongues and legs formed integral therewith, said tongues formed with an external raised portion and to flare outwardly of the band and said legs, said nut having an outwardly extended neck and an external shoulder at the outer end thereof, said legs formed to extend below the bottom of said tongues, said band adapted to be mounted on said neck whereby the legs join against the nut at base of the neck, adapted to hold the band from displacement and hold the tongues suspended above the base of the neck, for the purpose described.

In testimony whereof, I have hereunto set my hand, at Los Angeles, California, this 14th day of March, 1919.

JUNIUS A. BOWDEN.